(12) United States Patent
Nielson et al.

(10) Patent No.: US 8,783,106 B1
(45) Date of Patent: Jul. 22, 2014

(54) MICROMACHINED FORCE-BALANCE FEEDBACK ACCELEROMETER WITH OPTICAL DISPLACEMENT DETECTION

(75) Inventors: Gregory N. Nielson, Albuquerque, NM (US); Eric Langlois, Albuquerque, NM (US); Michael Baker, Albuquerque, NM (US); Murat Okandan, Edgewood, NM (US); Robert Anderson, Tucson, AZ (US)

(73) Assignee: Sandia Corporation, Albuquerque, NM (US)

( * ) Notice: Subject to any disclaimer, the term of this patent is extended or adjusted under 35 U.S.C. 154(b) by 261 days.

(21) Appl. No.: 13/324,012

(22) Filed: Dec. 13, 2011

(51) Int. Cl.
*G01P 15/093* (2006.01)
(52) U.S. Cl.
USPC .................................... 73/514.26; 73/514.19
(58) Field of Classification Search
USPC ...................... 73/514.26, 653, 514.19; 438/50
See application file for complete search history.

(56) References Cited

U.S. PATENT DOCUMENTS

| | | | |
|---|---|---|---|
| 4,239,963 A | 12/1980 | August et al. | |
| 4,306,456 A | 12/1981 | Maerfeld | |
| 5,493,223 A | 2/1996 | Leger | |
| 5,493,577 A | 2/1996 | Choquette et al. | |
| 5,568,499 A | 10/1996 | Lear | |
| 5,650,568 A | 7/1997 | Greiff et al. | |
| 5,936,294 A | 8/1999 | Zhang | |
| 5,959,452 A | 9/1999 | Givens et al. | |
| 5,978,401 A | 11/1999 | Morgan | |
| 5,998,995 A | 12/1999 | Osiander et al. | |
| 6,044,705 A | 4/2000 | Neukermans et al. | |
| 6,350,983 B1 | 2/2002 | Kaldor et al. | |
| 6,392,220 B1 | 5/2002 | Slater et al. | |
| 6,473,187 B1 | 10/2002 | Manalis | |
| 6,550,330 B1 | 4/2003 | Waters et al. | |
| 6,628,392 B2 | 9/2003 | Kuroda et al. | |
| 6,763,718 B1 | 7/2004 | Waters et al. | |
| 6,819,103 B2 | 11/2004 | Champion et al. | |
| 6,914,710 B1 | 7/2005 | Novotny et al. | |
| 7,091,715 B2 | 8/2006 | Nemirovsky et al. | |
| 7,116,430 B2 | 10/2006 | Degertekin et al. | |
| 7,173,764 B2 | 2/2007 | Carr et al. | |
| 7,339,738 B1 | 3/2008 | Carr et al. | |
| 7,394,245 B2 | 7/2008 | Brunson et al. | |
| 7,440,117 B2 | 10/2008 | Degertekin et al. | |

(Continued)

OTHER PUBLICATIONS

Hall, Neal A., et al., Micromachined Accelerometers With Optical Interferometric Read-Out and Integrated Electrostatic Actuation, Journal of Microelectromechanical Systems, vol. 17, No. 1, Feb. 2008, pp. 37-44.

(Continued)

*Primary Examiner* — John Chapman, Jr.
(74) *Attorney, Agent, or Firm* — Helen S. Baca

(57) ABSTRACT

An accelerometer includes a proof mass and a frame that are formed in a handle layer of a silicon-on-an-insulator (SOI). The proof mass is separated from the frame by a back-side trench that defines a boundary of the proof mass. The accelerometer also includes a reflector coupled to a top surface of the proof mass. An optical detector is located above the reflector at the device side. The accelerometer further includes at least one suspension spring. The suspension spring has a handle anchor that extends downwards from the device side to the handle layer to mechanically support upward and downward movement of the proof mass relative to a top surface of the proof mass.

22 Claims, 9 Drawing Sheets

(56) References Cited

U.S. PATENT DOCUMENTS

| | | | |
|---|---|---|---|
| 7,542,188 | B2 | 6/2009 | Zhou et al. |
| 7,743,661 | B2 | 6/2010 | Berthold et al. |
| 7,820,970 | B1 | 10/2010 | Shaw et al. |
| 7,826,065 | B1 | 11/2010 | Okandan et al. |
| 7,826,629 | B2 | 11/2010 | Miles et al. |
| 7,980,115 | B2 | 7/2011 | Stewart et al. |
| 8,205,497 | B1 * | 6/2012 | Okandan et al. ........... 73/514.26 |
| 2012/0198935 | A1 | 8/2012 | Samson et al. |

OTHER PUBLICATIONS

Hall, Neal A., Micromachined Optical Microphone Structures with Low thermal-Mechanical Noise Levels, Accoustical Society of America, Oct. 2007, pp. 2031-2037.

U.S. Appl. No. 13/325,683, filed Dec. 14, 2011, Nielson et al.

U.S. Appl. No. 13/326,139, filed Dec. 14, 2011, Nielson et al.

Czaplewski DA et al., "Integrated NEMS and optoelectronics for sensor applications," Sandia Technical Report No. SAND2007-7377, 2008 (47 pages).

Krishnamoorthy U et al., "In-plane nano-G accelerometer based on optical resonant detection system," Sandia Technical Report No. SAND2006-7634A, 2006 (2 pages).

Krishnamoorthy U et al., "In-plane nano-G accelerometer based on an optical resonant detection system," Tranducers 2007, Proceeding for the International Solid-State Sensors, Actuators and Microsystems Conference, Jun. 10-14, 2007, pp. 1195-1198.

Krishnamoorthy U et al., "In-plane MEMS-based nano-G accelerometer with sub-wavelength optical resonant sensor," Sens. Actuat. A 2008;145-146:283-90.

* cited by examiner

MICROMACHINED FORCE-BALANCE FEEDBACK ACCELEROMETER WITH OPTICAL DISPLACEMENT DETECTION

FEDERALLY SPONSORED RESEARCH

The United States Government has rights in this invention pursuant to Department of Energy Contract No. DE-AC04-94AL85000 with Sandia Corporation.

FIELD OF THE INVENTION

Micromachined accelerometer; and in particular, to a micromachined accelerometer that supports force-balance feedback and optical displacement detection.

BACKGROUND

An accelerometer measures proper acceleration, which is the acceleration it experiences relative to free fall. Proper acceleration is associated with the phenomenon of weight experienced by a proof mass that resides in a frame of reference of the accelerometer. An accelerometer measures the weight per unit of the proof mass, a quantity also known as specific force, or g-force. Conceptually, an accelerometer behaves as a damped mass on a spring. When the accelerometer experiences acceleration, the position of the proof mass is displaced with respect to the frame. The displacement is measured to determine the acceleration.

Accelerometers can be applied to inertia navigation, seismometry and a wide variety of diagnostic and instrumentation applications. For example, an accelerometer can be used to evaluate the performance of both the engine/drive train and the braking system of a vehicle.

Recent development in Micro-Electrical-Mechanical Systems (MEMS) technology has made it possible to build MEMS accelerometers (also called micromachined accelerometers). These micromachined accelerometers can be used in a wide variety of small-size light-weight handheld devices. However, there is a continuing need for the micromachined accelerometers to have high resolution and low noise.

SUMMARY

A method, apparatus and system of a micromachined accelerometer is disclosed. In one embodiment, a method is performed to fabricate a micro-machined accelerometer. In accordance with the method, a number of first device-side trenches are formed that extend from a device side of a silicon-on-an-insulator (SOI) through a buried oxide layer to reach a handle layer of the SOI. The first device-side trenches are filled with one or more materials different from oxide. A number of second device-side trenches are formed that extend from the device side to reach the buried oxide layer. The second device-side trenches are filled with oxide. Subsequently, accelerometer components are formed at the device side, the accelerometer components including an optical detector and at least one suspension spring for a proof mass. The suspension spring has a handle anchor that is formed from one of the filled first device-side trenches. A back-side trench is formed that extends from a bottom surface of the handle layer to reach the buried oxide layer. The back-side trench defines a boundary of the proof mass. A portion of the buried oxide layer is then removed through the second device-side trenches and the back-side trenches to allow upward and downward movement of the proof mass relative to a top surface of the proof mass.

In one embodiment, an apparatus functioning as an accelerometer is described. The apparatus includes a proof mass and a frame that is formed in a handle layer of a silicon-on-an-insulator (SOI). The proof mass is separated from the frame by a back-side trench that defines a boundary of the proof mass. The accelerometer also includes a reflector coupled to a top surface of the proof mass. An optical detector is located above the reflector at the device side. The accelerometer further includes at least one suspension spring. The suspension spring has a handle anchor that extends downwards from the device side to the handle layer to mechanically support upward and downward movement of the proof mass relative to a top surface of the proof mass.

In one embodiment, a system functioning as an accelerometer is described. The system includes a handle layer in which a proof mass and a frame are formed. The proof mass is separated from the frame by a back-side trench that defines a boundary of the proof mass. The accelerometer also includes a device layer coupled to the handle layer via a buried oxide layer. The device layer includes a reflector, an optical detector, a number of suspension springs, a number of up actuation electrodes and a number of down actuation electrodes. Each suspension spring has a handle anchor that extends downwards from the device side to the handle layer to mechanically support upward and downward movement of the proof mass relative to a top surface of the proof mass. Each up actuation electrode receives a first voltage that controls the upward movement of the proof mass, and each down actuation electrode receives a second voltage that controls the downward movement of the proof mass.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the present invention provide a micromachined accelerometer that can operate in a number of modes, such as force-balance feedback, optical lock-in, distance lock-in and open loop modes. The mode in which an accelerometer operates can be chosen to satisfy a particular application and operating environment. The accelerometer includes a number of suspension springs to support a large cylindrical proof mass (e.g., several millimeters in diameter and hundreds of microns thick, e.g., up to 650 um thick) that can move out-of-plane (i.e., perpendicularly with respect to the surface plane of the accelerometer). The accelerometer also includes up electrodes and down electrodes, as well as optical detection elements. A number of device-side and back-side trenches, as well as etch release holes, are built into a handle layer and a device layer of the accelerometer die to allow the accelerometer to be fabricated with a simple and efficient process.

The micromachined accelerometers described herein can be used in a variety of applications where high sensitivity and small device size are required, such as navigation systems, robotics, and physics experiments that require ultra-high sensitivity and isolation from seismic background signals.

Figure 1:
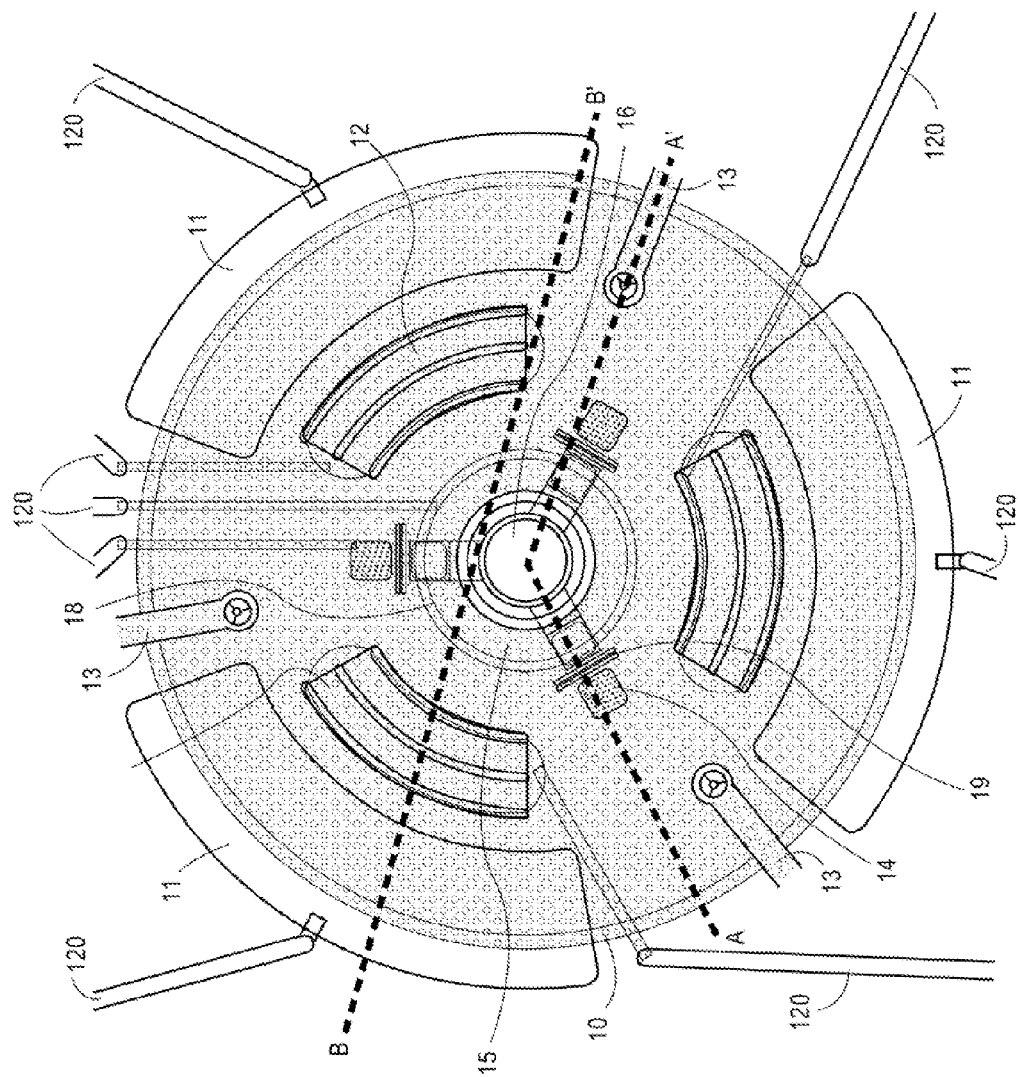
FIG. 1 illustrates a top view of one embodiment of an accelerometer.

FIG. 1 illustrates a top view of one embodiment of a micromachined accelerometer 100. The top view shows a number of main features of accelerometer 100 and omits some details to improve clarity. In this embodiment, accelerometer 100 has three up actuation electrodes 11, three down actuation electrodes 12 and three suspension springs 13, all of which are symmetrically arranged around an optical detector 15 in the center. Optical detector 15 includes a grating 16 in the center that can be electrostatically actuated. Grating 16 is supported by a support structure in the form of a circular structure 18 and three support arms 14, with each arm having a grating support spring 19. Each of up actuation electrodes 11, down actuation electrodes 12 and optical detector 15 lies in a device layer and has an electrical connection 120 to a power source, respectively. Suspension springs 13 are mechanically connected to a proof mass, which lies underneath the device layer and cannot be seen from the top. In one embodiment, accelerometer 100 has a diameter in the range of several millimeter and thickness in the range of 100 um (microns) to 1 mm.

In one embodiment, accelerometer 100 includes a large number of etch release holes 10 throughout the top surface. Etch release holes 10 allow etchant to enter a buried oxide layer underneath the top device layer. In one embodiment, etch release holes 10 are formed by etching into the device layer and filling with oxide in an early stage of the process flow. This allows the following processing steps to continue unimpeded with the same topography (as in a structure without these etch release holes). The layered-structure of accelerometer 100 will be described in further detail with reference to the vertical section views of FIGS. 3 and 4.

Figure 2:
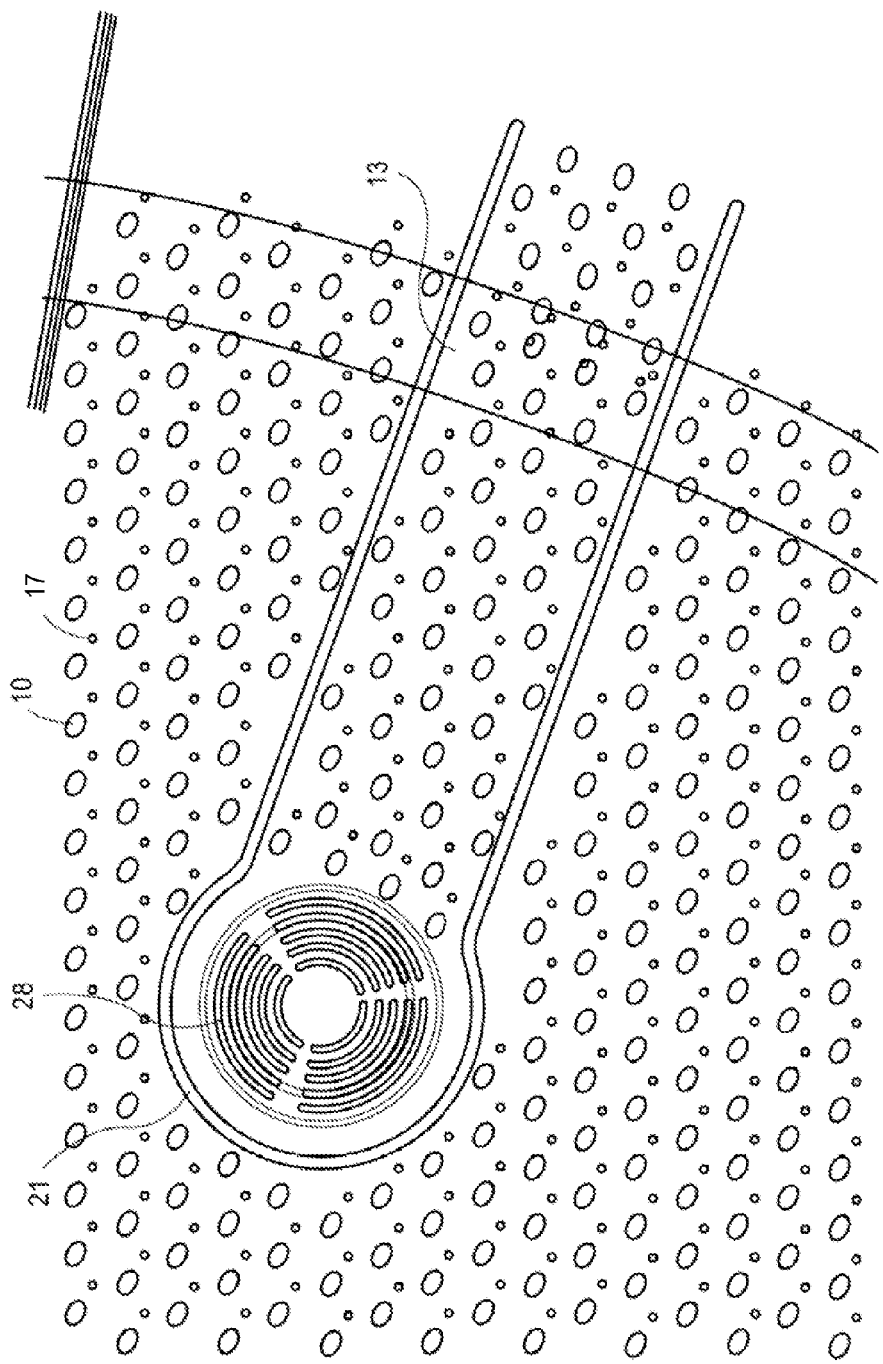
FIG. 2 illustrates a top view of one embodiment of a suspension spring in an accelerometer.

FIG. 2 illustrates a top view of suspension spring 13 in further detail. The boundary of suspension spring 13 is defined by a device-layer trench 21. Device-layer trench 21 isolates suspension spring 13 from the rest of the device layer to allow suspension spring 13 to move up and down. Suspension spring 13 includes a handle anchor 28, via which suspension spring 13 is anchored to the underlying proof mass (which cannot be seen in this view). FIG. 2 also shows small holes 17, as well as etch release holes 10, on the top surface. In one embodiment, small holes 17 cut through an upper part of the device layer to a lower part of the device layer. Therefore, small holes 17 can serve as stapling points that allow, for example, upper-layer silicon nitride and polysilicon to be attached to the lower device layer, such that the device layer can move as a rigid structure.

Figure 3:
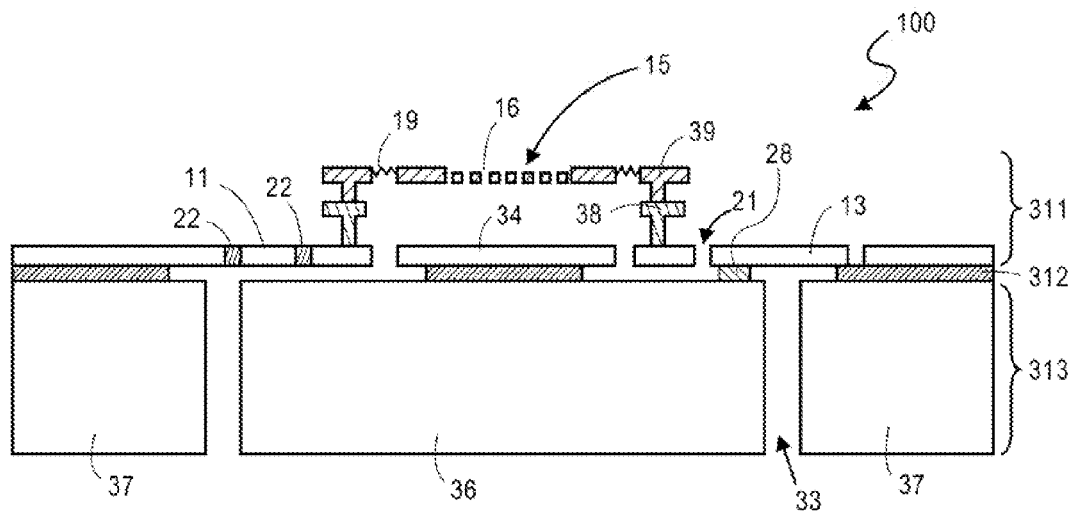
FIG. 3 illustrates a first vertical section view of one embodiment of an accelerometer.

FIG. 3 shows a vertical section view of accelerometer 100 as seen from the plane labeled as line A-A' in FIG. 1. The vertical section view of FIG. 3 has been simplified to show only one up actuation electrode 11, one suspension spring 13 and optical detector 15 in a device layer 311. Device layer 311 acts as the top support plate for the entire assembly. Underneath device layer 311 is a buried oxide layer 312 and a handle layer 313. At the beginning of the accelerometer fabrication process, buried oxide layer 312 fills the entire area between device layer 311 and handle layer 313. Near the end of the fabrication process, portions of buried oxide layer 312 have been removed to allow movement of device parts, and the remaining portions of buried oxide layer 312 serve as a mechanical connection between device layer 311 and handle layer 313. In the vertical section view of FIG. 3, only a center section and two side sections of buried oxide layer 312 can be seen.

In one embodiment, handle layer 313 includes a proof mass 36 and a frame 37, which are separated by a handle-layer trench 33. In one embodiment, proof mass 36 has a cylindrical shape, and frame 37 has a hollowed circular shape that surrounds proof mass 36. Frame 37 is connected to device layer 311 via the two side sections of buried oxide layer 312. Proof mass 36 is suspended from frame 37 by suspension springs 13, and each suspension spring 13 is anchored to proof mass 36 via handle anchor 28 deposited in oxide layer 312. Each suspension spring 13 is also mechanically coupled to frame 37, which in turn is supported by a holder (not shown) to keep frame 37 in place. The boundary of suspension spring 13 in device layer 311 is defined by device-layer trench 21.

On top of proof mass 36 viewed is the center section of buried oxide layer 312 and a reflector structure (also referred to as a reflector 34). Proof mass 36 and the layers on its top (i.e., the center section of oxide layer 312 and reflector 34) can move up and down in a direction perpendicular to the top surface of proof mass 36. In one embodiment, a cavity (not shown) lies under proof mass 36 to provide space for its up and down movement. This up and down movement is also referred to as "out-of-plane" movement or movement in the z-direction. As suspension springs 13 (only one is shown in this view) are anchored to proof mass 36, suspension springs 13 will bend upwards and downwards with the movement of proof mass 36. The physical characteristics of suspension springs 13 determine how far proof mass 36 moves in relation to frame 37. A very compliant spring allows larger displacement (that is, higher sensitivity), and a stiffer spring allows less displacement (that is, lower sensitivity). There is a tradeoff between sensitivity and resonance frequency: the higher the sensitivity, the lower the resonance frequency of accelerometer 100 so it can only operate up to a certain frequency range. Therefore, for higher frequency range operation, some of that sensitivity needs to be traded off.

In one embodiment, the boundary of up actuation electrode 11 is defined by two silicon nitride area 22. Silicon nitride areas 22 electrically isolate up actuation electrode 11 from the rest of device layer 311. Up actuation electrode 11 receives a voltage (e.g., a number of volts) from one of the electrical connection 120 shown in FIG. 1. Proof mass 36 is connected to a ground voltage. Therefore, in one embodiment, when the proof mass 36 moves down, a positive voltage applied to up actuation electrode 11 can generate a force to pull up proof mass 36. As up actuation electrodes 11 are symmetrically arranged around accelerometer 100 (as shown in the top view of FIG. 1), no torque is generated by the combined upward force of up actuation electrodes 11.

As described above with reference to FIG. 1, optical detector 15 includes grating 16 supported by a support structure. Optical detector 15 in the vertical section view of FIG. 3 is in the form of an anchor layer 38 (which is circular structure 18 in FIG. 1) and a grating layer 39 (which includes grating 16, support arm 14 and grating support spring 19). Grating support spring 19 allows grating 16 to be moveable, which is a property utilized in the distance lock-in mode to be described in detail later.

In one embodiment, grating layer 39 is connected to a ground voltage and is electrically isolated from anchor layer 38. A positive voltage applied to anchor layer 38 (via one of the electrical connection 120 of FIG. 1) will cause grating layer 39 to move downwards (toward proof mass 36). The amount of grating movement can be dependent on the applied voltage level. Therefore, in one embodiment, the distance between grating 16 and reflector 34 can be adjusted by controlling the voltage applied to anchor layer 38.

In one embodiment, when accelerometer 100 accelerates, proof mass 36 has the tendency to stay in the same position due to inertia while the rest of the accelerometer structure moves up or down. This phenomenon changes the distance between grating 16 and reflector 34, and the change of distance ("displacement") can be detected and measured by optical detector 15 based on known principles of optical interferometry (e.g., Michelson interferometer, Fabry-Perot interferometer, or the like). The amount of acceleration can be determined from the amount of measured displacement.

Figure 4:
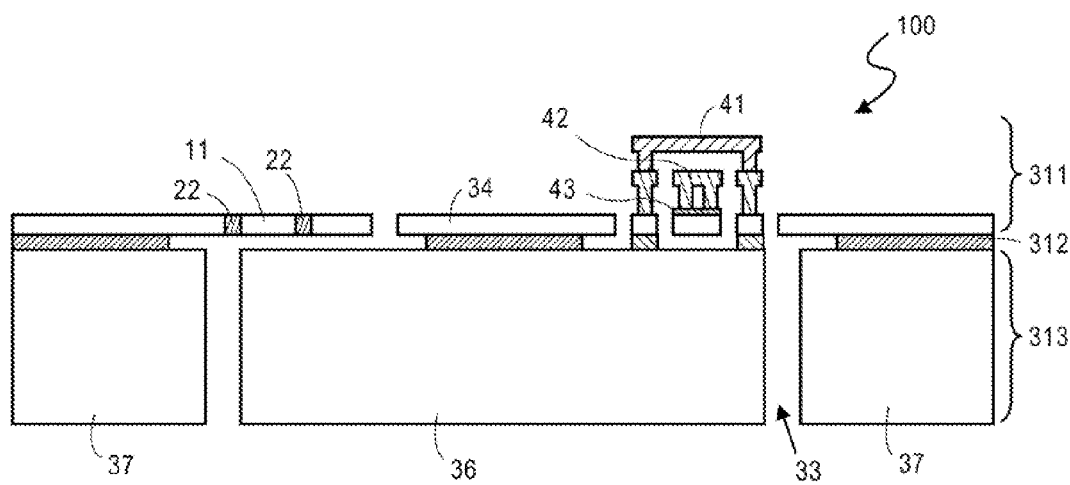
FIG. 4 illustrates a second vertical section view of one embodiment of an accelerometer.

FIG. 4 is another vertical section view of accelerometer 100 as seen from the plane labeled as line B-B' in FIG. 1. The vertical section view of FIG. 4 has been simplified to show only one up actuation electrode 11 and one down actuation electrode 12 in device layer 311.

Referring to FIG. 4, down actuation electrode 12 includes a ground-voltage layer 41, an electrode element 42 and a base 43. Ground-voltage layer 41 is connected to a ground voltage and electrode element 42 is connected to one of the electrical connections 120 shown in FIG. 1. Electrode element 42 is held in place by structure not shown in this view. In one embodiment, base 43 is a silicon nitride section, which serves to electrically isolate electrode element 42 from the rest of device layer 311. When a positive voltage is applied to electrode element 42, ground-voltage layer 41 will be electrostatically pulled downwards. As ground-voltage layer 41 is mechanically connected to proof mass 36, this downward force will push down proof mass 36, causing the distance between grating 16 and reflector 34 to increase. As down actuation electrodes 12 are symmetrically arranged around accelerometer 100 (as shown in the top view of FIG. 1), no torque is generated by the combined downward force of down actuation electrodes 12.

The versatile features integrated into the accelerometer 100 allow accelerometer 100 to operate in one of many different modes. When operating accelerometer 100 in an open-loop mode, a laser is used to shine through grating 16 and the resulting diffraction orders indicate the position of reflector 34. The acceleration can be measured from the changes in intensity of the diffraction orders. When operating accelerometer 100 in an optical lock-in mode, grating 16 can be controlled to vibrate at a frequency (e.g., 2 kHz), and the position of reflector 34 can be measured in step with the 2 kHz signal. This optical lock-in detection removes noise sources that are in frequency ranges different form the 2 kHz operating frequency, and, therefore, allows high precision measurement of the acceleration.

In a distance lock-in mode, the relative position of gating 16 can be locked with respect to reflector 34 by adjusting a voltage applied to anchor layer 38 of optical detector 15 (FIG. 3), such that the voltage is proportional to the motion of proof mass 36. That is, if proof mass 36 moves down, a higher voltage can be applied. If proof mass 36 moves up, the voltage is reduced such that grating 16 will move back up and the separation between grating 16 and reflector 34 will stay the same. This mode provides a higher dynamic range for accelerometer operation. In a force-balanced feedback mode, once the direction of proof mass motion is detected, a voltage is applied to up actuation electrodes 11 and down actuation electrodes 12 to generate forces that keep proof mass 36 in place. The amount of applied voltage can be used to measure the acceleration.

In one embodiment, the accelerometer mode can be chosen based on the application needs. For example, in a high acceleration condition, a corresponding high voltage is needed for the force-balance feedback mode. If such a high voltage is not available, the accelerator can be operated in the optical lock-in mode or open-loop mode. In another scenario, the accelerometer can be operated in the open-loop mode if the sensing of large acceleration (but not the small signals) is needed. In another scenario, the accelerometer can be operated in the distance lock-in mode when a high dynamic range is necessary. In yet another scenario, the accelerator can be operated in the force-balance feedback mode when the acceleration is relatively low and does not require a voltage that exceeds the operating voltage range.

Figure 5A:
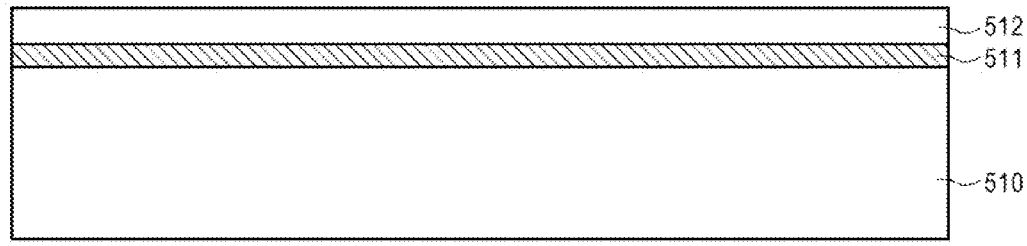
FIGS. 5A-5N illustrate a process in which an accelerometer is formed according to one embodiment of the invention.
Figure 5B:
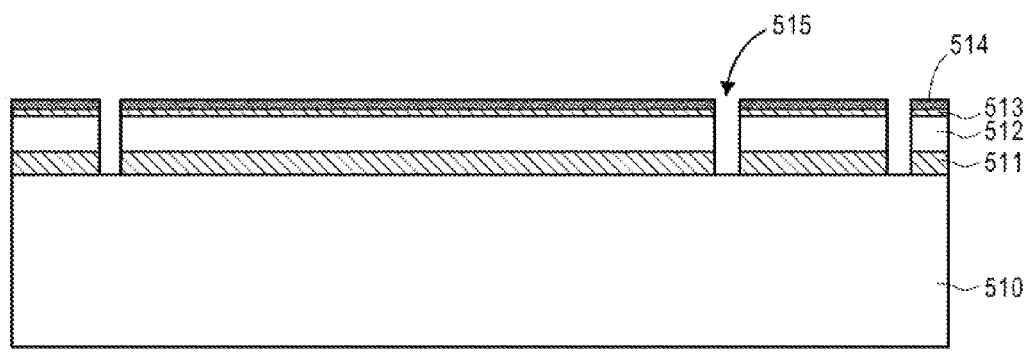
Figure 5C:
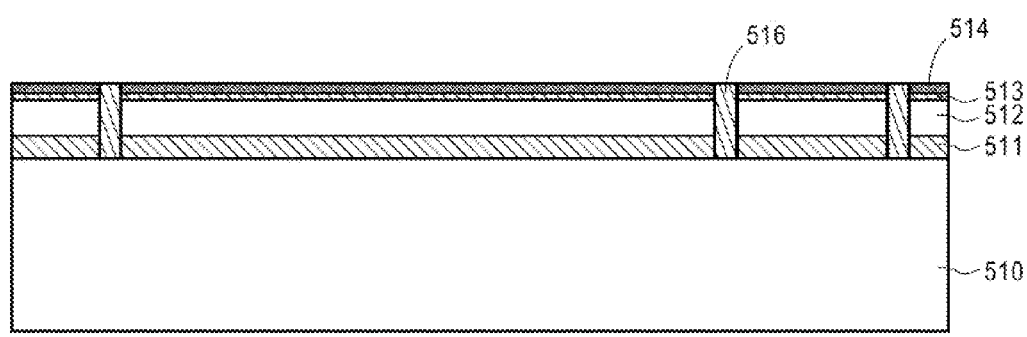
Figure 5D:
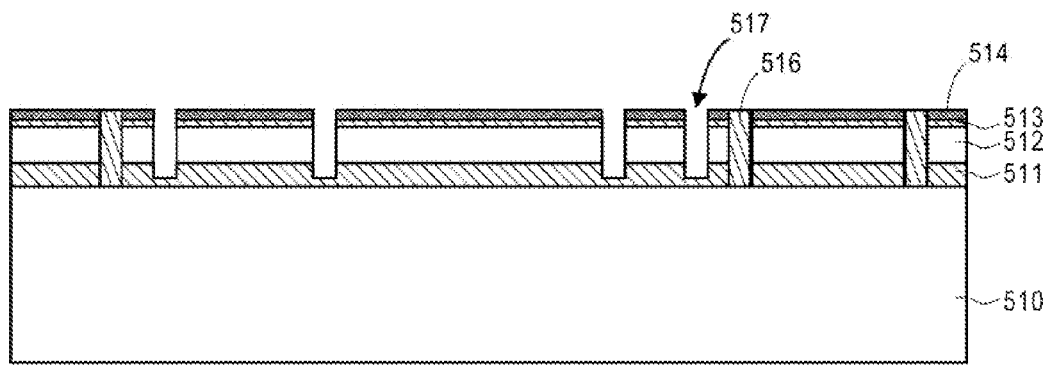
Figure 5E:
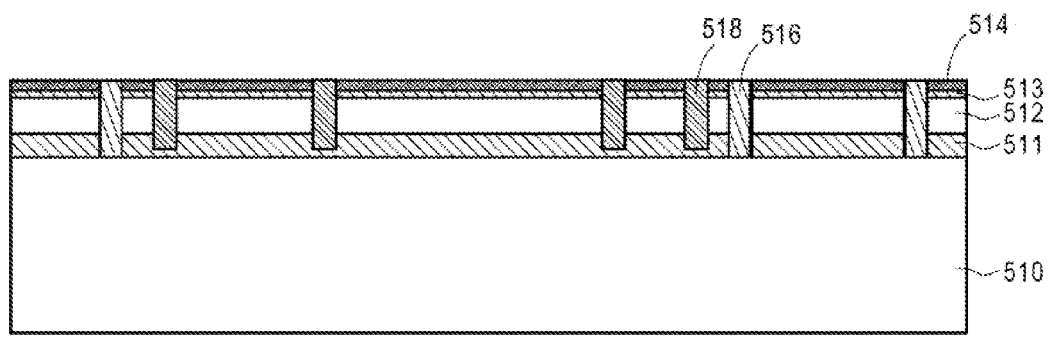
Figure 5F:
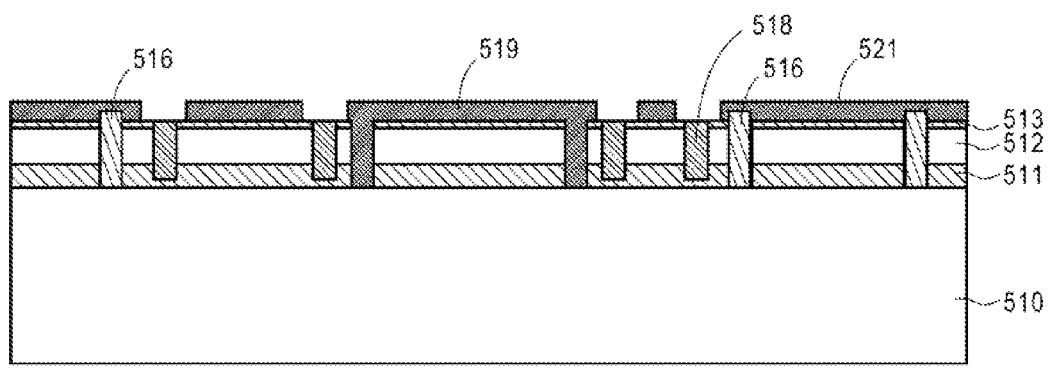
Figure 5G:
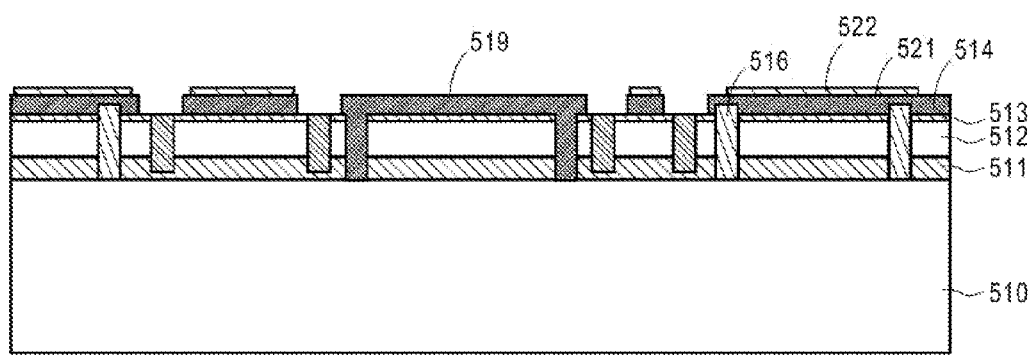
Figure 5H:
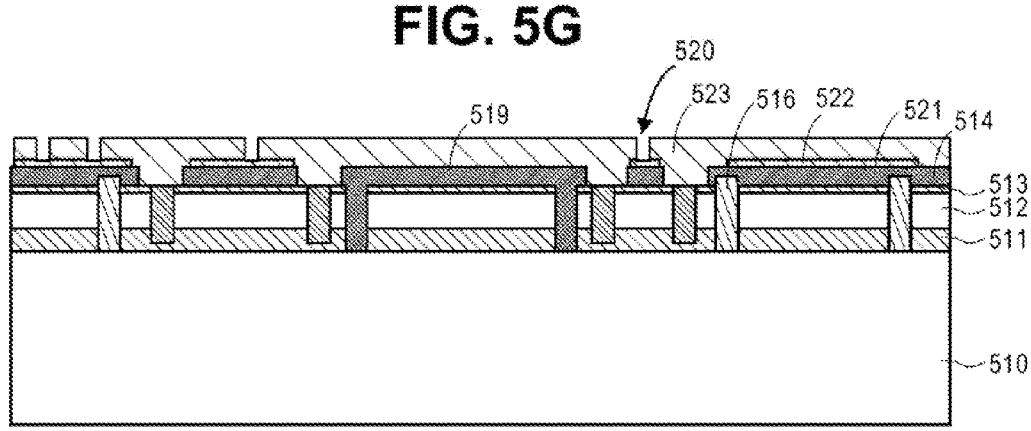
Figure 5I:
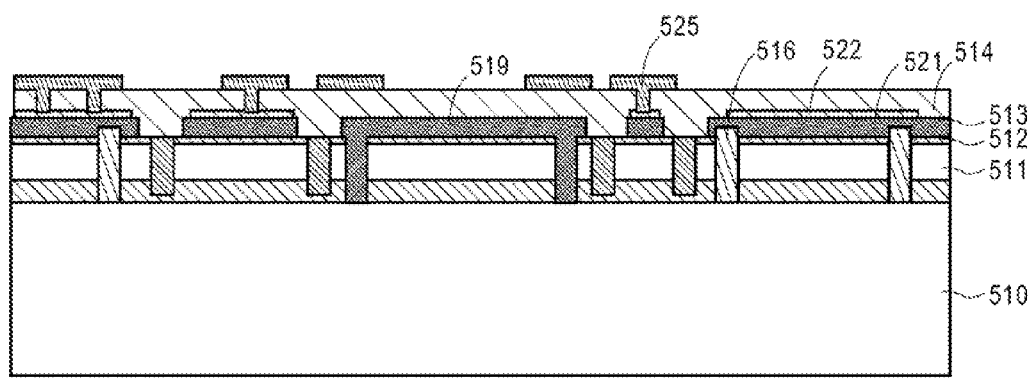
Figure 5J:
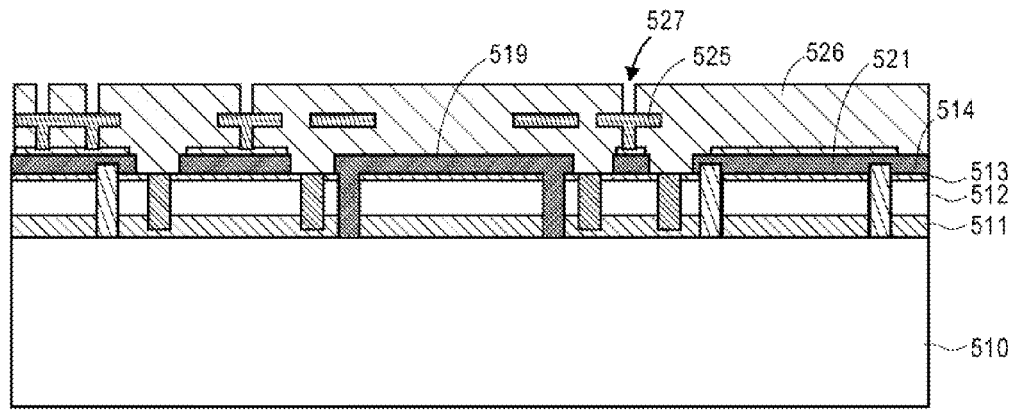
Figure 5K:
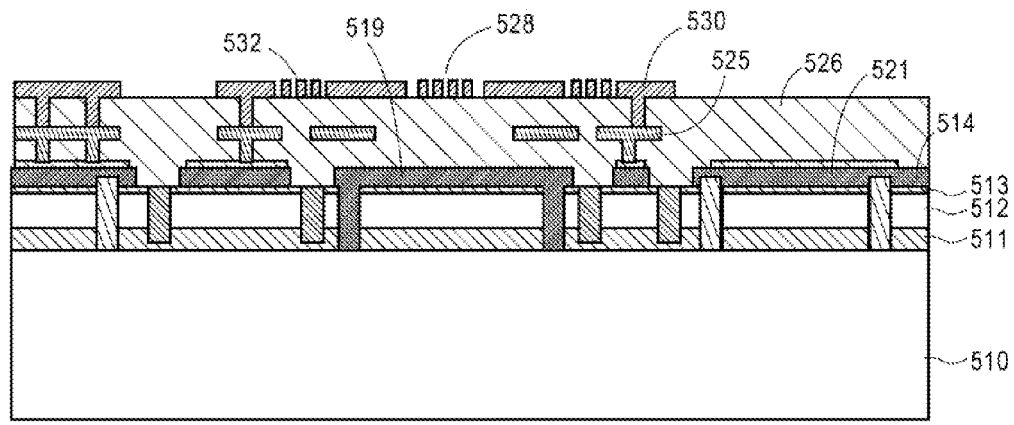
Figure 5L:
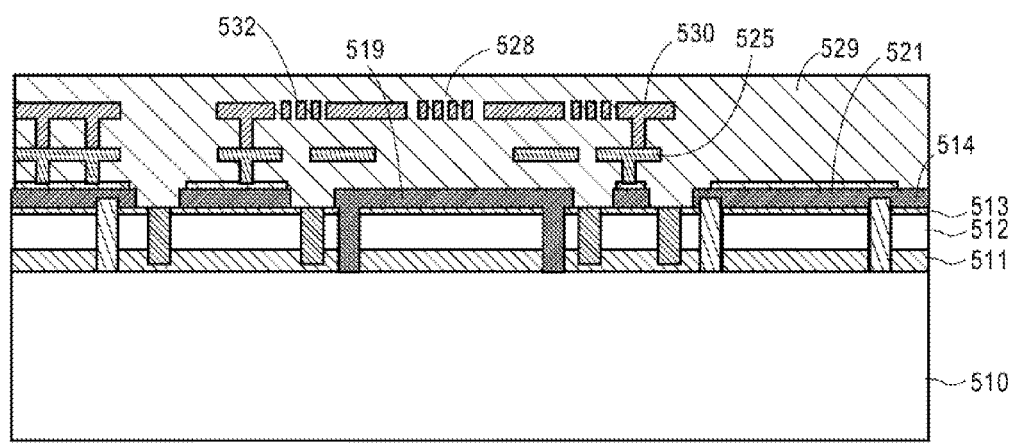
Figure 5M:
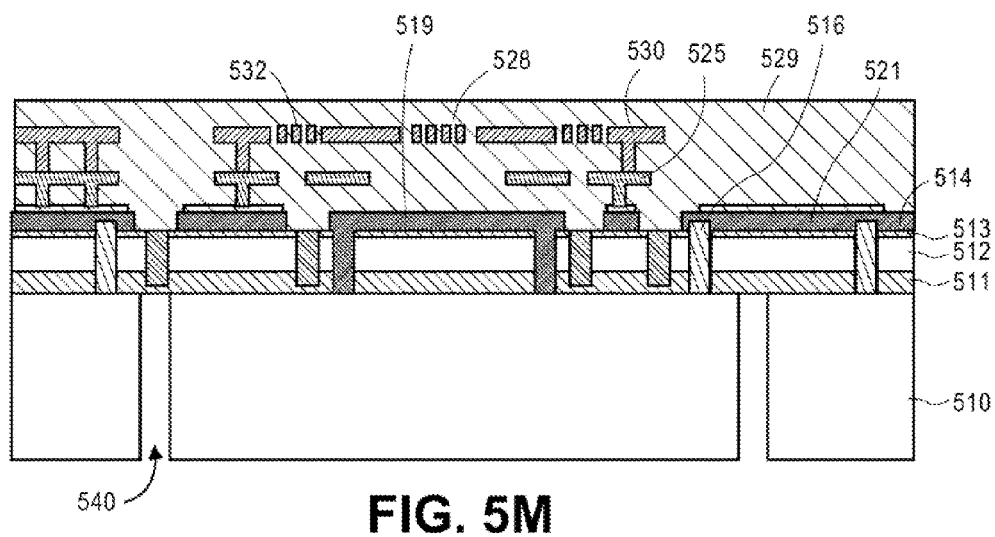
Figure 5N:
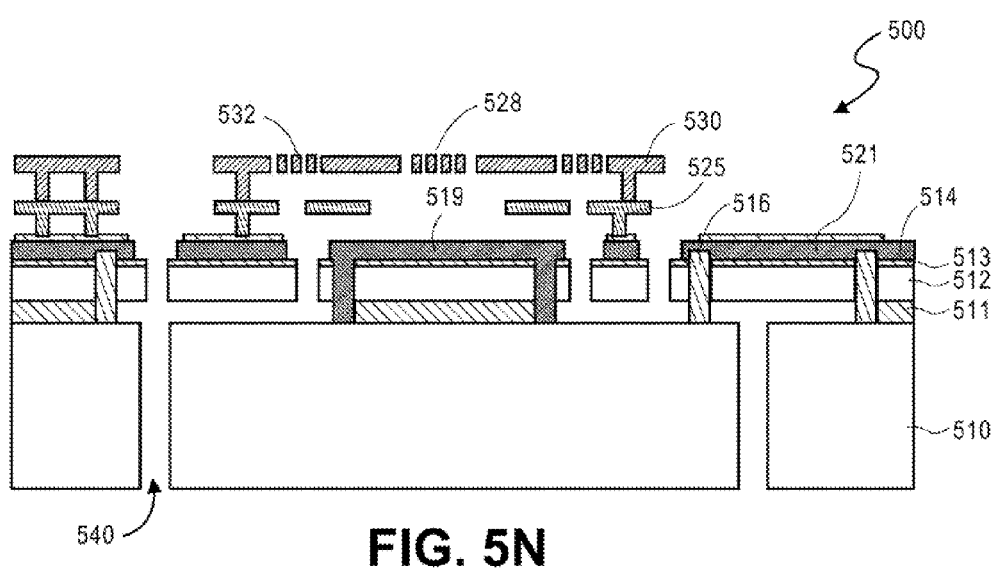

FIGS. 5A-5N illustrates an embodiment of a process for fabricating an accelerometer (e.g., accelerometer 100 of FIGS. 1-4). For simplicity of the illustration, the diagrams of FIGS. 5A-5N omit some of the device features (e.g., up actuation electrodes, down actuation electrodes, etch release holes, etc.). Some of the device features shown in FIG. 5A-5N may have more or fewer layers than the corresponding device features shown in FIGS. 1-4. It is understood that the device features produced by the process of FIG. 5A-5N have the same or substantially the same functionality as their counterparts shown in FIGS. 1-4. It is also understood that the device features shown in FIGS. 1-4 but omitted in FIGS. 5A-5N can be produced by the same or substantially the same process as shown in FIGS. 5A-5N.

Referring to FIG. 5A, a silicon-on-an-insulator (SOI) is used as a base structure for fabricating an accelerometer, such as accelerometer 100 of FIGS. 1-4. The SOI includes a device layer 512, a buried oxide layer 511 and a handle layer 510. The thickness of device layer 512, oxide layer 511 and handle layer 510, for example, can be in the range of 5-40 um, 0.5-3 um and 200-650 um, respectively. Device layer 512 is the initial or base device layer. In the subsequent process, many additional layers will form on top of device layer 512. These additional layers and device layer 512 will be collectively referred to as the "device side" or "device layer" for the resulting accelerometer.

In FIG. 5B, an oxide layer 513 is grown or deposited (e.g., 1000 Å-6000 Å thick) on the top surface, followed by a silicon nitride layer 514 (e.g., 3000 Å thick) deposited on top of oxide layer 513. The top surface of this assembly is patterned and etched to form a number of device-side trenches 515 (e.g., 0.5-1.5 um wide) down to handle layer 510. In FIG. 5C, a layer of doped polysilicon (e.g., 1-2 um thick) is deposited to fill device-side trenches 515, and then planarized (e.g., by chemical mechanical polish/planarization (CMP) or etch-back. The planarization or etching stops on the top surface of silicon nitride layer 514 to form polysilicon supports 516. A number of these polysilicon-filled trenches are to become the anchors (e.g., handle anchor 28 of FIG. 2) of suspension springs (e.g., suspension springs 13 of FIG. 2) later in the process.

In FIG. 5D, a number of additional device-side trenches 517 (e.g., 0.5-1.5 um wide) are patterned or etched down to buried oxide layer 511. In FIG. 5E, a layer of oxide (e.g., 0.5-1 um thick) is deposited to fill additional device-side trenches 517, and then planarized (e.g., by CMP) or etched back oxide. The planarization or etching stops on the top surface of silicon nitride layer 514 to form oxide-filled trenches 518. In one embodiment, etch release holes can be patterned and filled with oxide at the same time as the device-side trenches 517.

In FIG. 5F, additional device-side trenches (e.g., 0.5-1.5 um wide) are patterned or etched down to handle layer 510, and silicon nitride (e.g., 0.3-1 um thick) is deposited into these additional trenches. Then the top surface of the silicon nitride is etched and planarized to form segments of silicon nitride structures. Some of the silicon nitride structures are to become a reflector 519 (e.g., reflector 34 of FIG. 3), part of suspension springs 521 (e.g., suspension springs 13 of FIG. 2), among other components.

In FIG. 5G, a layer of polysilicon 522 (e.g., 0.3-1 um thick) is deposited and patterned to form an additional layer of suspension springs 521. In FIG. 5H, a layer of oxide 523 (e.g., 0.5-2 um thick) is deposited on the top surface, and then planarized (e.g., by CMP), patterned and etched to form a number of openings 520 in the oxide that reach polysilicon layer 522. FIG. 5I shows that another layer of polysilicon (e.g., 1-2.5 um thick) is deposited, patterned and etched. A portion of the remaining polysilicon becomes anchors 525 (e.g., anchor layer 38 of FIG. 3) of a grating structure (e.g., grating 16 of FIG. 3).

In FIG. 5J, another layer of oxide 526 (e.g., 1-2.5 um thick) is deposited on the top surface, planarized and etched. A number of openings 527 are formed in oxide layer 526. In FIG. 5K, a layer of polysilicon (e.g., 1-2.5 um thick) is deposited, patterned and etched to form a grating layer (e.g., grating layer 39 of FIG. 3), which includes a grating 528, support arms 530 and grating support springs 532. In FIG. 5L, an additional layer of oxide (e.g., 1-3 um thick) is deposited on the top surface 529, such that the device side becomes a solid oxide-filled block.

FIG. 5M shows a back-side process that follows the above device-side process. In one embodiment, the bottom of handle layer 510 is patterned and etched, stopping at the bottom surface of buried oxide 511 to form back-side trenches 540 (or referred to handle-layer trenches). After back-side trenches 540 are formed, in FIG. 5N, all of the exposed oxide, except the captured oxide regions, is removed in a final release process. In one embodiment, the final release process uses (HF) as release chemistry. Captured oxide regions are regions of buried oxide 510 enclosed by polysilicon-filled trenches or silicon-nitride-filled trenches that were formed earlier in the process, since release chemistry (HF) does not remove polysilicon or silicon nitride. For example, the removed oxide can include filled oxide 529 and 518, portions of oxide layer 513 and portions of buried oxide layer 511, as well as the oxide in the etch release holes if any etch release holes have been formed. This release process is simple and efficient, because buried oxide layer 511 can be removed along with the oxide layers deposited during the processing stages. An accelerometer 500 is formed as a result of this final release process. Subsequently, electrical connections can be made to provide voltage to accelerometer 500.

Figure 6:
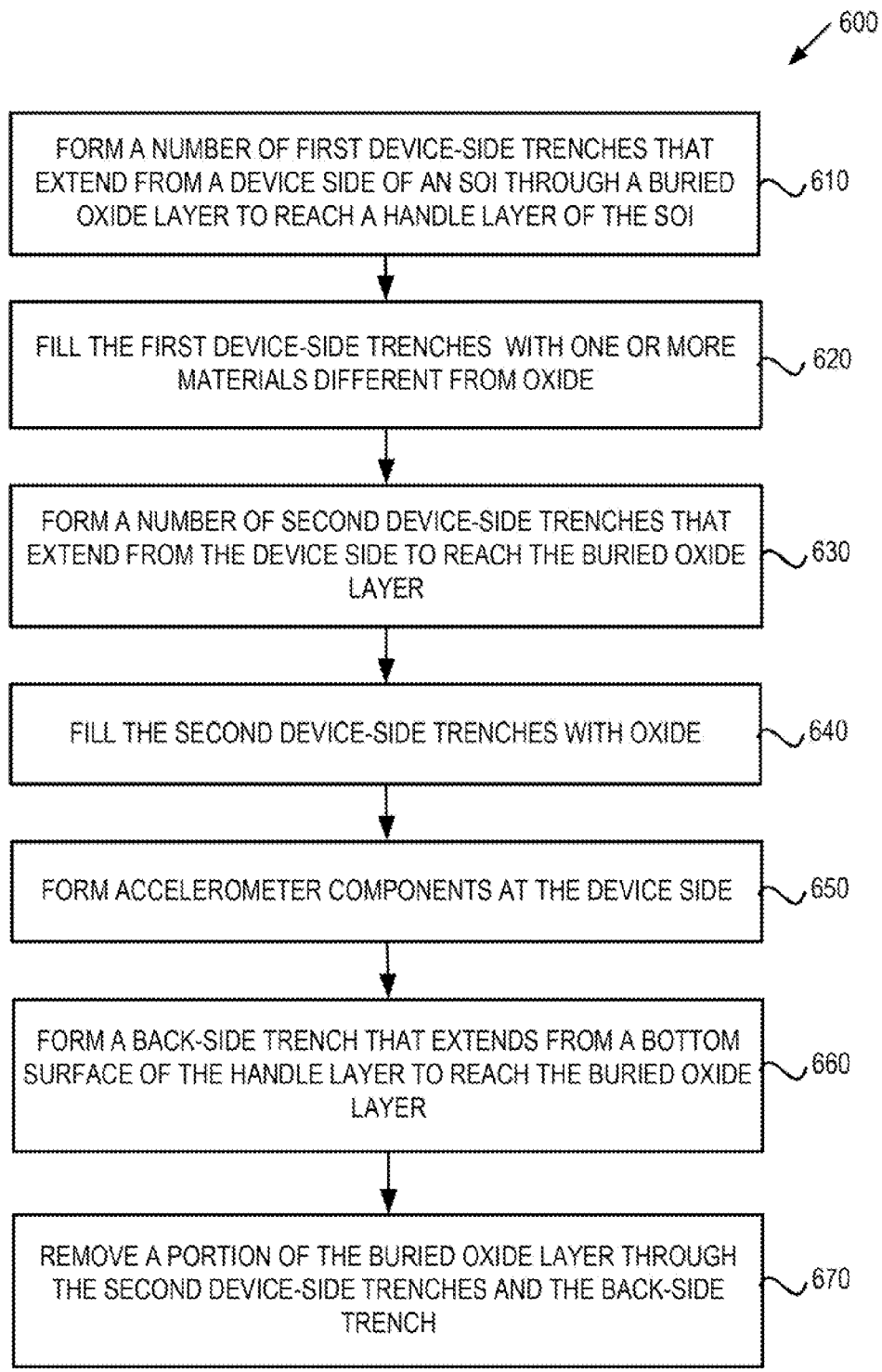
FIG. 6 is a flow diagram of one embodiment of a method of fabricating an accelerometer.

FIG. 6 is a flow diagram of one embodiment of a method of fabricating an accelerometer (e.g., accelerometer 100 of FIGS. 1-4 and accelerometer 500 of FIG. 5N). In one embodiment, a number of first device-side trenches are formed that extend from a device side of a silicon-on-an-insulator (SOI) through a buried oxide layer to reach a handle layer of the SOI (block 610). The first device-side trenches are filled with one or more materials different from oxide (e.g., the materials can include polysilicon and silicon nitride, which form polysilicon-filled trenches and silicon-nitride-filled trenches, respectively) (block 620). A number of second device-side trenches are formed that extend from the device side to reach the buried oxide layer (block 630). The second device-side trenches are filled with oxide (block 640). In one embodiment, the formation of the second device-side trenches can occur subsequent to the polysilicon-filled trenches and prior to the silicon-nitride-filled trenches. Subsequently, accelerometer components are formed at the device side, the accelerometer components including an optical detector and at least one suspension spring for a proof mass (block 650). The suspension spring has a handle anchor that is formed from one of the filled first device-side trenches. A back-side trench is formed that extends from a bottom surface of the handle layer to reach the buried oxide layer (block 660). The back-side trench defines a boundary of the proof mass. A portion of the buried oxide layer is then removed through the second device-side trenches and the back-side trenches (block 670) to allow upward and downward movement of the proof mass relative to a top surface of the proof mass.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method of fabricating a micro-machined accelerometer, comprising:
    forming first device-side trenches that extend from a device side of a silicon-on-an-insulator (SOI) through a buried oxide layer to reach a handle layer of the SOI, the first device-side trenches filled with one or more materials different from oxide;
    forming second device-side trenches that extend from the device side to reach the buried oxide layer, the second device-side trenches filled with oxide;
    forming accelerometer components at the device side, the accelerometer components comprising an optical detector and at least one suspension spring for a proof mass, the at least one suspension spring having a handle anchor formed from one of the filled first device-side trenches;
    forming a back-side trench that extends from a bottom surface of the handle layer to reach the buried oxide layer, the back-side trench define a boundary of the proof mass; and
    removing a portion of the buried oxide layer through the second device-side trenches and the back-side trenches to allow upward and downward movement of the proof mass relative to a top surface of the proof mass.

2. The method of claim 1, wherein the accelerometer components further comprise at least one up actuation electrode and at least one down actuation electrode.

3. The method of claim 1, further comprising:
    forming a plurality of release holes that extend from the device side to reach the buried oxide layer;
    filling the release holes with oxide; and
    removing the portion of the buried oxide layer through the second device-side trenches, the back-side trenches and the release holes.

4. The method of claim 1, further comprising:
before forming the back-side trenches, filling the accelerometer components that are formed at the device side with oxide to form a solid oxide-filled block.

5. The method of claim 1, wherein the material different from oxide comprises doped polysilicon.

6. The method of claim 1, further comprising:
forming third device-side trenches that extend from the device side down to the handle layer; and
filling the third device-side trenches with silicon nitride to form part of a reflector structure of the accelerometer.

7. An apparatus comprising:
a proof mass and a frame in a handle layer of a silicon-on-an-insulator (SOI), the proof mass separated from the frame by a back-side trench that defines a boundary of the proof mass;
a reflector at a device side of the SOI and coupled to a top surface of the proof mass;
an optical detector located above the reflector at the device side; and
at least one suspension spring having a handle anchor that extends downwards from the device side to the handle layer to mechanically support upward and downward movement of the proof mass relative to a top surface of the proof mass.

8. The apparatus of claim 7, further comprising:
at least one up actuation electrode coupled to a first electrical connection that supplies a first voltage to control upward movement of the proof mass; and
at least one down actuation electrode coupled to a second electrical connection that supplies a second voltage to control downward movement of the proof mass.

9. The apparatus of claim 8, wherein at least one up actuation electrode is formed in a device layer of the SOI and has a boundary defined by silicon nitride.

10. The apparatus of claim 8, wherein at least one down actuation electrode has an electrode element coupled to the second electrical connection, and a ground-voltage layer that is above the electrode element and is maintained at a ground voltage.

11. The apparatus of claim 7, wherein the optical detector further comprises:
a grating maintained at a ground voltage; and
a support structure that mechanically supports the grating, at least part of the support structure coupled to an electrical connection to receive a voltage that controls the position of the grating.

12. The apparatus of claim 7, further comprising:
three suspension springs, three up actuation electrodes and three down actuation electrodes, all of which are symmetrically arranged around the optical detector.

13. The apparatus of claim 7, further comprising:
a plurality of device-side trenches that reach downwards through a buried oxide layer of the SOI to the handle layer, wherein at least one of the device-side trenches defines a boundary of the at least one suspension spring.

14. The apparatus of claim 13, further comprising:
a plurality of release holes that reach downwards through a buried oxide layer of the SOI to the handle layer, wherein each of the release holes is smaller in size than each of the device-side trenches.

15. A system comprising:
a handle layer, which comprises:
a proof mass and a frame, the proof mass separated from the frame by a back-side trench that defines a boundary of the proof mass; and
a device layer coupled to the handle layer via a buried oxide layer, the device layer comprising:
a reflector;
an optical detector;
a plurality of suspension springs, each of the suspension springs having a handle anchor that extends downwards to the handle layer to mechanically support upward and downward movement of the proof mass relative to a top surface of the proof mass;
a plurality of up actuation electrodes to receive a first voltage that controls the upward movement of the proof mass; and
a plurality of down actuation electrodes to receive a second voltage that controls the downward movement of the proof mass.

16. The system of claim 15, wherein each of the up actuation electrodes has a boundary defined by silicon nitride.

17. The system of claim 15, wherein each of the down actuation electrodes has an electrode element coupled to the second electrical connection, and a ground-voltage layer that is above the electrode element and is maintained at a ground voltage.

18. The system of claim 15, wherein the optical detector further comprises:
a grating maintained at a ground voltage; and
a support structure that mechanically supports the grating, at least part of the support structure coupled to an electrical connection to receive a voltage that controls the position of the grating.

19. The system of claim 15, wherein a boundary of each of the suspension springs is defined by a device-side trench that reaches downwards through the buried oxide layer to the handle layer.

20. The system of claim 15, wherein the system comprises a laser configured to shine through the optical detector.

21. A method of operating the system of claim 15, the method comprising:
vibrating the optical detector at a frequency signal and
measuring a position of the reflector in step with the frequency signal.

22. A method of operating the system of claim 15, the method comprising:
applying a voltage to the optical detector, the plurality of up actuation electrodes, or the plurality of down actuation electrodes, wherein the applied voltage is proportional to the motion of the proof mass, and
measuring the applied voltage to measure the acceleration or motion of the proof mass.

\* \* \* \* \*